March 22, 1966 — C. E. GUTSHALL — 3,241,426
DRILLING AND TAPPING SCREW WITH RAGGED CUTTING EDGES
Filed Nov. 8, 1963 — 2 Sheets-Sheet 1
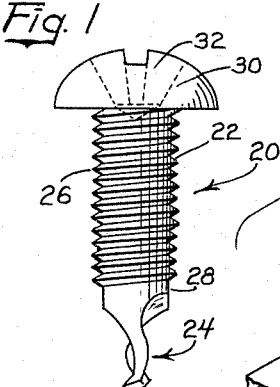
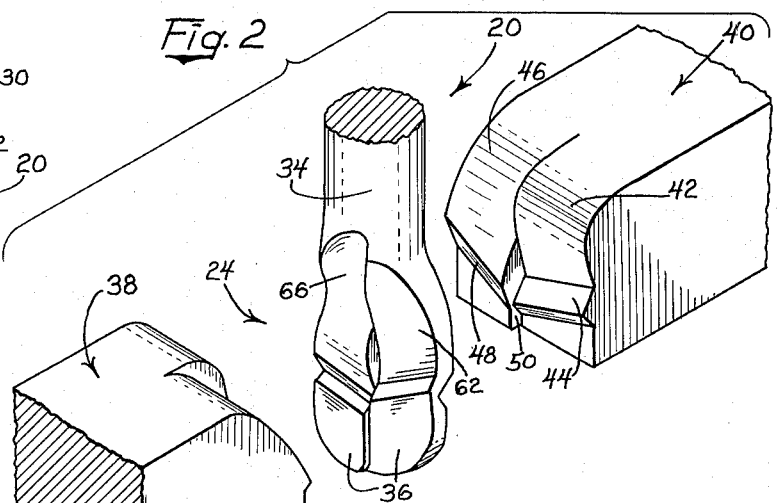
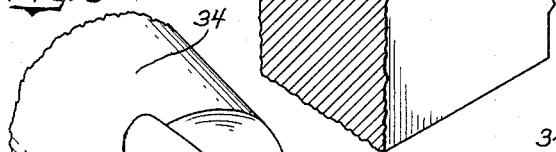
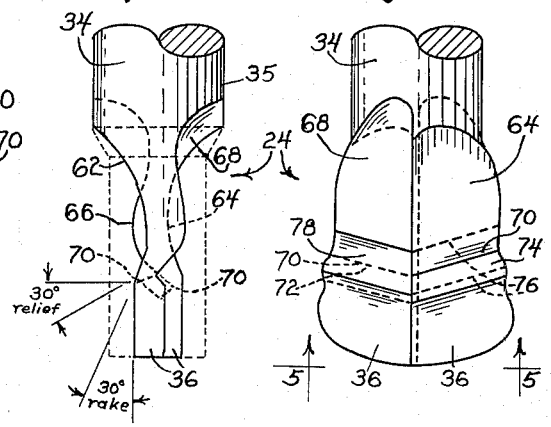
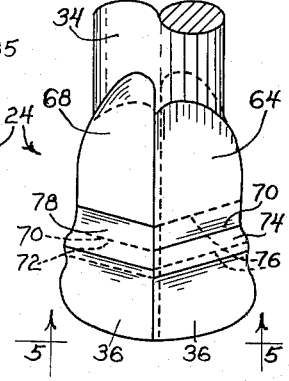
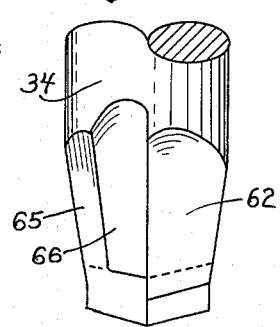
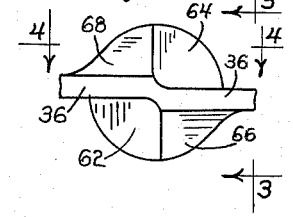
INVENTOR.
Charles E. Gutshall
BY
His Att'y

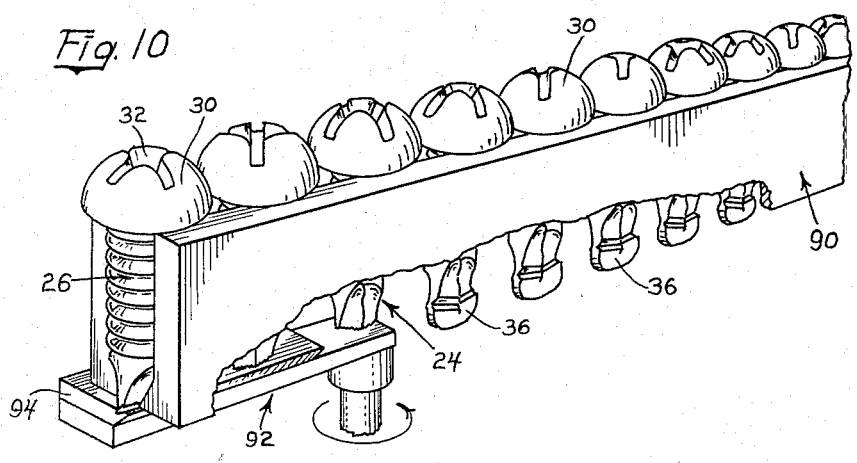
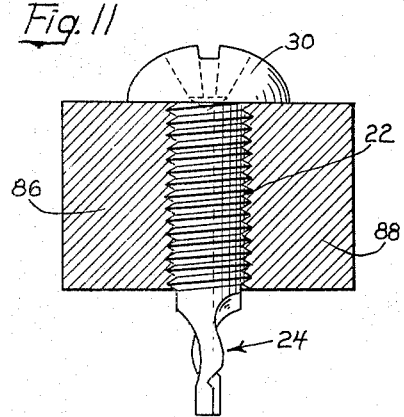
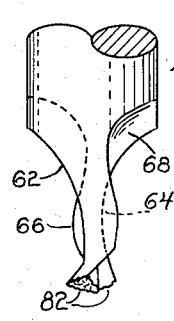
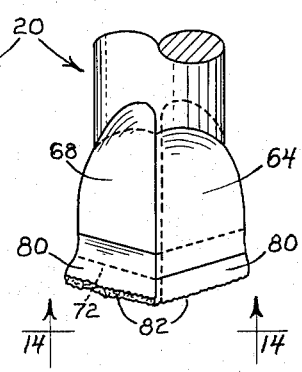
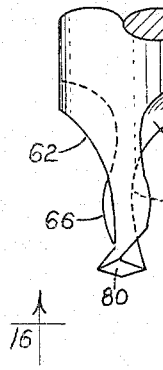
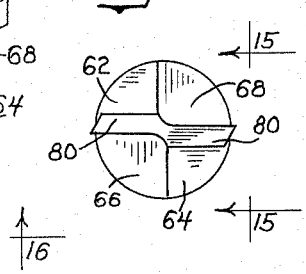
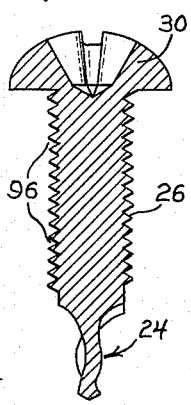
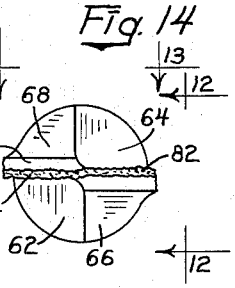
INVENTOR.
Charles E. Gutshall
BY
His Att'y

United States Patent Office 3,241,426
Patented Mar. 22, 1966

3,241,426
DRILLING AND TAPPING SCREW WITH
RAGGED CUTTING EDGES
Charles E. Gutshall, Roselle, Ill., assignor to Illinois Tool
Works Inc., Chicago, Ill., a corporation of Delaware
Filed Nov. 8, 1963, Ser. No. 322,337
3 Claims. (Cl. 85—47)

The present invention relates to a novel threaded fastener, and more particularly to a novel drilling and tapping screw.

One subject of the present invention is to provide a novel screw capable of drilling a hole in a work piece in an effective manner so as to facilitate application of the screw to the work piece.

Another object of the present invention is to provide a novel screw of the above-described type, and a method for producing the same whereby ragged cutting edges are provided on the screw drilling tip portion to insure the formation of a strong and effective drilling point on the screw.

A further object of the present invention is to provide a hardened drilling and tapping screw and a method for making the same wherein the screw may be provided with ragged or ground axially inclined cutting edges having a rake and relief angle. The cutting edges project from a transversely disposed end surface of the screw on opposite sides of a diametrical plane extending through the axis of the screw shank to define the drilling tip portion. Flute means formed on the entiring end of the screw extend rearwardly from the cutting edges and intersect the periphery of the entering end portion for receiving and directing chips from the cutting edges.

Another object of the present invention is the provision of a novel drilling and tapping screw and a method for making the same wherein the screw is initially forged with a protective portion for the drilling tip to prevent destruction or ruination thereof during subsequent operations, and which protective portion is severed thereafter to provide an unharmed drilling tip.

Still a further object of the present invention is the provision of a novel screw of the above described type having a tapered drilling portion which can ream the hole drilled by the cutting edges of the screw to increase the speed and efficiency of the screw in its application to a work piece.

A still further object of the present invention is to provide a novel work piece drilling and thread cutting screw of the above-described type which may be produced in an economical manner, and which is durable in its use.

Other objects and advantages of the present invention will become apparent from the following description and the accompanying drawings wherein:

FIG. 1 is an elevational view showing a screw incorporating features of the present invention;

FIG. 2 is an enlarged fragmentary perspective view of the entering end portion of the screw blank just after it has been forged between the opposing die elements;

FIG. 3 is an enlarged fragmentary front elevational view of the forged portion of the screw blank taken along line 3—3 of FIG. 5;

FIG. 4 is an enlarged fragmentary side elevational view of the forged portion of the screw blank taken along line 4—4 of FIG. 5;

FIG. 5 is a bottom plan view of the forged portion of the screw blank taken along line 5—5 of FIG. 4;

FIG. 6 is an enlarged fragmentary perspective view of the forged portion of the screw blank;

FIG. 7 is an enlarged fragmentary perspective view of the screw blank with ragged cutting edges;

FIG. 8 is an enlarged fragmentary perspective view of the screw blank after it has been ground;

FIG. 9 is an enlarged fragmentary front elevational view of the screw blank with a tapered entering end portion;

FIG. 10 is an enlarged fragmentary perspective view of the apparatus used in removing part of the screw blank;

FIG. 11 is a partial sectional view showing the manner in which a forged blank may be rolled between suitable die blocks for forming helical thread convolutions thereon;

FIG. 12 is an enlarged fragmentary front elevational view of the screw blank showing the ragged cutting edges formed after removal of a part of the screw blank by the apparatus of FIG. 10;

FIG. 13 is an enlarged fragmentary side elevational view of the screw shown in FIG. 12 as taken along line 11—11 of FIG. 14;

FIG. 14 is a bottom plan view of the screw shown in FIG. 13 as taken along line 13—13 of that figure;

FIG. 15 is an enlarged fragmentary front elevational view of the entering end portion of the screw blank after it has been ground;

FIG. 16 is a bottom plan view of the screw blank taken along line 16—16 of FIG. 15;

FIG. 17 is a partial sectional view of an enlarged and completed screw blank showing the hardened and plated formations thereon.

Referring now more specifically to the drawings wherein like parts are designated by the same numerals throughout the various figures, a screw 20 is shown in finished condition in FIGS. 1 and 17. The screw comprises an elongated shank 22 having an entering end portion 24 which is formed in a manner to be described so as to provide a work piece cutting or drilling tip. Helical thread convolutions 26 are formed integrally with a trailing portion of the screw shank, and a part of these convolutions immediately adjacent the entering end portion or drilling tip 24 are of progressively decreasing height as illustrated at 28 so as to facilitate entry of the thread convolutions into an aperture drilled in a work piece by the entering end portion 24 of the screw. A head 30 is provided at the trailing end of the screw shank, and is preferably provided with suitable slot means 32 for cooperative engagement with a tool, not shown, which is to be used to turn the screw. It is to be understood that the head of the screw may be any member permitting rotary driving movement of the fastener shank such as hexagonally-shaped head, a slotted set screw head, or the like.

In accordance with the present invention, the blank for the screw may be initially formed or extruded with a head, a smooth cylindrical shank, and an end portion of reduced diameter as shown by the imaginary lines in FIG. 3. In this initial condition, the blank preferably has a first diameter along its trailing section 34 (FIG. 3) on which the thread convolutions 26 are to be formed, a second smaller diameter along the entering end portion 24 as shown in FIG. 3, and a progressively decreasing diameter 35 between the trailing section 34 and the entering end portion 24 on which the tapering thread convolutions 28 may be formed. In some instances, it may also be desirable for the flutes of the drilling portion to extend partially within the threads to receive chips cut by the threads.

From the initial condition of the blank, the entering end portion is pinched or cold forged between complementary die elements 38 and 40 in the manner shown in FIG. 2 so as to provide the structural features described in detail below. The dies are supported in die blocks, not shown, which are in turn adapted to be mounted in an apparatus of known construction having means for actuating the die elements 38 and 40 toward and away from each other so as to forge the screw blank.

It is to be noted that the dies are identically formed but oppositely disposed, and present blank forming surfaces on each of the die elements. The configuration of a die face is best shown by die 40 wherein there is provided a first blank forming surface having a bulging upper end portion 42 terminating in an inclined convex portion 44, and a second blank forming surface having a downwardly sloping portion 46 which terminates in the undercut surface portion 48. At the lowest extremity of the die face, there may be provided a projection 50 which will form the offset flattened end portion 36 of the blank. The blank forming surfaces of die 38 are, of course, oppositely positioned from that shown by die 40 for mating engagement therewith.

Referring now to FIGS. 2–6, the entering end portion of the screw will be described as it is formed by the opposed die elements 38 and 40. When the screw blank is pinched or forged between the identical but oppositely disposed die elements, a pair of identical diagonally opposite flutes 62 and 64 is provided on opposite sides of the entering end portion 24. The flutes are formed by the bulging upper portion 42 of the die elements, and are adapted to receive and direct chips from the cutting edges. Adjacent the flutes 62 and 64, there is provided curvilinear portions 66 and 68 respectively, the upper portions of which may also receive and direct chips from the cutting edges. Surfaces 72–78 are formed by the inclined convex portion 44 and undercut surface portion 48 of the die elements, and are located directly beneath the flute means and the curvilinear portions of the screw blank. In order to avoid duplication of description, it is to be noted, for example, that surfaces 72 and 76 as shown in FIGS. 6–8 are formed respectively by the undercut surface portion 48 and the inclined convex portion 44 of die element 38, and are respectively located beneath flute means 62 and curvilinear portion 66.

Beneath the surfaces 72–78, a flattened end portion 36 is formed by the die elements 38 and 40 during the forging operation. This flattened end portion 36, which is formed at the unheaded end portion of the blank, is adapted to be removed or separated from the remainder of the blank by subsequent operations which will be described in detail below. As shown in FIG. 7 of the drawings, the removal of the flattened end portion 36 shown in FIGS. 2–6 will expose cutting teeth 80 at the entering end portion of the blank. These teeth have a ragged cutting edge 82 and are bounded by the surfaces 72–78 to provide a rake and relief for the cutting teeth and increase the cutting effectiveness thereof. As best shown in FIG. 3, the entering end portion 24 of the blank is forged to provide a designed relief and rake angle which is shown as being approximately 30°. The relief surfaces of the cutting edges are offset 30° from a plane extending normal to the shank axis and the rake surfaces of the cutting edges have a 30° angle with respect to a plane extending along the shank axis as can be perceived in the drawings. The relief and rake surfaces may be offset at any suitable angle which will promote the cutting effectiveness of the teeth.

After the blank has been forged in the manner shown in FIGS. 2–6 of the drawings, the blank is rolled between a pair of thread forming die blocks 86, 88 shown in FIG. 11, which die blocks form the previously described thread convolutions 26 and 28. The die blocks 86 and 88 and the associated apparatus for rolling the screw blanks therebetween are of known construction and need not be described in detail for the present invention. If desired, the entering end portion 24 of the screw blank may be worked upon during the thread rolling operation for controlling the diameter of the entering end portion and thus the diameter of an aperture which the screw will form in a work piece as described in my prior Patent 3,079,831, dated March 5, 1963.

The thread rolling and forging operations may be reversed from the order described above, and if such is done, care must be taken to prevent destruction or mutilation of the screw threads during the forging operation.

When the threading and forging operations have been completed, the screw may be subjected to a selected hardening and coating treatment to increase the strength and prolong the period of operation of the screw. Anyone of the various hardening treatments for metal which are familiar to those skilled in the art such as carburizing, nitriding, or other well known hardening treatments may be used. Similarly, the protective coating applied to the screw after hardening may be accomplished by electroplating, dipping, or any other well known approach. The hardened and coated screw is designated by numeral 96 in FIG. 17. Coating the screw may be required only in special instances, and for normal conditions, hardening the screw alone will suffice.

Once these initial steps have been completed, the drilling tip portion is ready to be formed on the screw. Screws are either manually or mechanically oriented by the flattened end portion 36, placed and held in alignment within chute 90, and then fed by gravity toward rotating arm 92. The arm 92 carries a severing blade 94, and these parts are so located with respect to the screws positioned in the chutes that the severing blade 94 of the rotating arm 92 will literally knock off and separate the flattened end portions 36 of the screws to form the drilling tip portion. To facilitate this fracturing or removal operation, the forged entering end portion 24 of the screw is provided with a pair of axially inclined weakened portions 70 as shown in FIGS. 2–6 on opposite sides of a diametrical plane extending through the axis of the shank. These weakened portions are very thin and are of necessity the thinnest part of the forged entering end portion 24 to insure that the severing blade 94 will separate the flattened end portion 36 from the remainder of the screw blank. The protection given to the cutting teeth 80 by the flattened end portion 36 will prevent ruination of the cutting teeth during the thread rolling, hardening and any other operations which are subsequent to the forging operation to provide an unharmed drilling tip for the screw.

The removal of the flattened end portions from the screw blank along the axially inclined weakened or frangible web portions 70 will provide ragged or broken cutting edges 82 on the cutting teeth 80 as best shown in FIGS. 7 and 12–14. The ragged or broken cutting edge 82, with their inherent irregularities of a sharp nature, are desirable for use with soft metals, work surfaces requiring chip-breaker type cutting edges, or materials requiring a drilling point that abrade a hole as opposed to cutting. With the designed rake and relief surfaces and the ragged or broken cutting edges, the screw will efficiently perform these described functions in an effective manner. Even if the severing blade 94 produces a break which is perpendicular to the axis of the screw with no actual relief occurring at the fracture, a satisfactory cutting edge may nevertheless be provided due to the fact that the edges are thin and are provided with a designed rake and relief as has been discussed above.

If the broken or ragged cutting edges 82 are not desired for the finished screw, they may be removed following the separation of the flattened end portion 36 from the remainder of the screw. While the screws are still oriented in the chute 90, the broken or ragged cutting edges 82 may be removed by grinding across the drilling point at a compound angle which maintains the relieved cutting edges, maintains the point angle and also grinds off excessive metal caused by diametrical expansion during forging as shown in FIGS. 8 and 14–15. Grinding surfaces 65 will remove excess metal produced during forging whereas the grinding of the cutting teeth 80 will remove the broken or ragged cutting edges 82 and shape the edges of the cutting teeth to a sharp point. The grinding may be omitted if the entering end portion is rolled to size during the thread rolling operation as described in my aforesaid patent, and the broken or ragged cutting edges 82 are described.

A further operation may be performed on the entering end portion of the screw where a reaming portion is desired to be formed intermediate the drilling and tapping portions of the screw. As best shown in FIG. 9, the entering end portion in such a case will be provided with a taper which converges toward the drilling tip portion of the screw by griding the side surfaces 65 of the entering end portion. Reaming a small drill hole is faster than drilling a larger hole so that by providing a reaming portion intermediate the drilling tip and tapping portions, the speed with which the screw will be applied to a work piece will be increased.

From the foregoing, it will now be apparent that the present invention contemplates a novel drilling and tapping screw and a method for making the same wherein the screw may be provided with ragged or ground axially inclined cutting edges having a rake and relief angle. The cutting edges project from a transversely disposed end surface of the screw on opposite sides of a diametrical plane extending through the axis of the screw shank to define the drilling tip portion. Flute means formed on the entering end of the screw extend rearwardly from the cutting edges and intersect the periphery of the entering end portion for receiving and directing chips from the cutting edges, and may extend partially within the plurality of helical thread convolutions formed on the trailing section of the shank. A reaming portion may also be provided on the screw intermediate the drilling and tapping portions to provide a smooth bore and increase the speed of application of the screw to a work piece.

While the preferred embodiments of the present invention have been shown and described herein, it is obvious that many structural details may be changed without departing from the spirit and scope of the appended claims.

I claim:
1. A drilling and tapping screw comprising an elongated shank having a forged entering end portion and an enlarged tool receiving head portion integral with a trailing end portion of the shank, said forged entering end portion having a thickness at its extremity substantially less than the diameter of the remainder of said shank, said end portion including a transversely disposed end surface and a plurality of flute means extending axially away from said end surface and intersecting the periphery of said forged entering end portion, said flute means defining rake and relief means on opposite sides of said forged entering end portion adjacent said end surface, said end surface having axially inclined random and irregular ragged cutting edges being of the same material as the forged entering end portion and the remainder of the screw, said cutting edges projecting downwardly between said rake and relief means on opposite sides of a diametral plane including the axis of said shank to define a V-shaped drilling tip portion, said shank including a plurality of helical thread convolutions extending toward the trailing end portion of the shank to define a tapping portion.

2. The drilling and tapping screw as defined in claim 1 wherein the flute means extend partially within the plurality of helical thread convolutions.

3. The drilling and tapping screw as set forth in claim 1 wherein the entering end portion is provided with a taper converging toward said drilling portion, and a plurality of cutting edges at the juncture of said flutes and the tapered entering end surface portions for reaming the hole made by said drilling tip portion.

References Cited by the Examiner

UNITED STATES PATENTS

| | | | |
|---|---|---|---|
| 1,698,951 | 1/1929 | Holmes | 85—47 |
| 2,388,482 | 11/1945 | Haynes | 85—47 |
| 2,457,156 | 12/1948 | Jones | 76—108 |
| 2,479,730 | 8/1949 | Dewar | 85—47 |
| 2,572,647 | 10/1951 | Merwin | 85—47 |
| 2,652,578 | 9/1953 | Chiaberta | 10—10 |
| 2,740,136 | 4/1956 | Chiaberta et al. | 10—10 |
| 3,079,831 | 3/1963 | Gutshall | 85—47 |
| 3,094,893 | 6/1963 | Lindstrom | 85—47 |

CARL W. TOMLIN, *Primary Examiner.*

EDWARD C. ALLEN, *Examiner.*

M. PARSONS, JR., *Assistant Examiner.*